United States Patent
Griesbach

(10) Patent No.: US 10,823,226 B2
(45) Date of Patent: Nov. 3, 2020

(54) ARRANGEMENT FOR A BEARING OF AN INPUT SHAFT BUILD AS PLANET CARRIER OF A PLANETARY GEAR SET

(71) Applicant: ZF Friedrichshafen AG, Friedrichshafen (DE)

(72) Inventor: Michael Griesbach, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/507,542

(22) Filed: Jul. 10, 2019

(65) Prior Publication Data
US 2020/0018353 A1 Jan. 16, 2020

(30) Foreign Application Priority Data
Jul. 11, 2018 (DE) .................. 10 2018 211 491

(51) Int. Cl.
*F16H 57/08* (2006.01)
*F16C 35/06* (2006.01)
*F16H 57/021* (2012.01)

(52) U.S. Cl.
CPC .......... *F16C 35/06* (2013.01); *F16H 57/021* (2013.01); *F16H 57/082* (2013.01); *F16H 2057/085* (2013.01)

(58) Field of Classification Search
CPC ........... F16H 57/082; F16H 57/021; F16H 2057/085; F16H 57/0472; F16H 57/043; F16H 57/0471; F16H 57/0479; F16C 35/06; F16C 35/063; F16C 19/46; F16C 35/067; F16C 19/545; F16C 2361/61; F16C 33/7809
See application file for complete search history.

(56) References Cited

U.S. PATENT DOCUMENTS

| | | | | |
|---|---|---|---|---|
| 2,743,971 A * | 5/1956 | Kramcsak, Jr. | ..... | B60B 33/0028 384/489 |
| 3,752,543 A * | 8/1973 | Schmidt | ................... | F16C 19/26 384/484 |
| 4,957,195 A * | 9/1990 | Kano | ................... | F16D 25/0638 192/106 F |
| 5,456,476 A * | 10/1995 | Premiski | ............. | F16H 57/0427 277/641 |
| 9,382,998 B1 * | 7/2016 | Hart | ..................... | F16H 63/3026 |
| 2008/0006503 A1 | 1/2008 | Diosi et al. | | |

(Continued)

FOREIGN PATENT DOCUMENTS

| DE | 102006031788 A1 | 1/2008 |
|---|---|---|
| DE | 202008010007 U1 | 11/2008 |
| DE | 202008010028 U1 | 11/2008 |

*Primary Examiner* — David J Hlavka
(74) *Attorney, Agent, or Firm* — Dority & Manning, P.A.

(57) ABSTRACT

An arrangement for mounting an output shaft (1) designed as a spider shaft of the planetary gear set of a transmission includes an axial needle bearing (6) arranged between an output-side spider plate (4) of the output shaft (1) and a housing (5) of the transmission, a radial needle bearing (7) for the radial mounting of the output shaft (1) in the housing (5), a thrust washer (8) attached to the output shaft (1) with the aid of a snap ring (9), and a shaft sealing ring (10) arranged on the side of the thrust washer (8) facing the output, into the interior space of which the thrust washer (8) and the snap ring (9) for attaching the thrust washer (8) extend.

9 Claims, 3 Drawing Sheets

(56) References Cited

U.S. PATENT DOCUMENTS

2008/0131044 A1* 6/2008 Bauer ................ F16C 19/46
384/486
2010/0151986 A1* 6/2010 Burgman ............ F16H 57/0479
475/348
2016/0356364 A1* 12/2016 Torii .................. F16H 3/663

* cited by examiner

ARRANGEMENT FOR A BEARING OF AN INPUT SHAFT BUILD AS PLANET CARRIER OF A PLANETARY GEAR SET

FIELD OF THE INVENTION

The present invention relates generally to an arrangement for mounting a spider shaft of a planetary gear set of a transmission.

BACKGROUND

Planetary gear sets including, as elements, a sun gear, a ring gear, and a carrier, are utilized in automotive engineering, for example, as components of vehicle transmissions. These types of planetary transmissions can be designed as simple minus or plus planetary transmissions or gear sets. A *minus* planetary transmission is known as a simple planetary transmission including, as elements, a sun gear, a ring gear, and a carrier including planet gears displaceably mounted thereon with the aid of planet shafts, wherein each of these planet gears has tooth contact with the sun gear and the ring gear. As a result, when the carrier is fixed, the ring gear has a direction of rotation that is opposite that of the sun gear. In contrast, a simple plus planetary transmission includes a sun gear, a ring gear, and a carrier, on which inner and outer planet gears are rotatably mounted, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and a positive stationary transmission ratio results.

DE 10 2006 031 788 A1 describes an output shaft which is connected to the planet carrier of the planetary gear set facing the output end, and which is mounted with respect to the transmission housing with the aid of two antifriction bearings, namely an outer grooved ball bearing, as a fixed bearing, and an inner needle bearing, as a floating bearing, wherein a clutch pressure feed is provided, which is arranged in the area axially between these two antifriction bearings and feeds pressurized oil, which is supplied via a transmission housing bore hole, into an oil duct of the output shaft.

DE 20 2008 010 007 U1 describes an arrangement for mounting an output shaft of an automatic transmission, wherein the output shaft is designed as a spider shaft of an output-side planetary gear set and is supported with respect to a transmission housing with the aid of a first and a second antifriction bearing. In this case, the output shaft is additionally supported with the aid of a third bearing which is arranged on the side of the planetary gear set facing away from the spider shaft. The third bearing supports a spider plate—which faces away from the output end—of the planet carrier on a transmission shaft which, in turn, is mounted in the output shaft.

Moreover, DE 20 2008 010028 U1 describes an arrangement for mounting an output shaft of an automatic transmission, wherein the output shaft is a spider shaft of a planetary gear set and is supported with respect to a transmission housing with the aid of a first and a second antifriction bearing, and wherein the antifriction bearings are angular continuous ball bearings in an O-shaped arrangement, i.e., are designed having pressure lines extending obliquely outward.

SUMMARY OF THE INVENTION

Example aspects of the present invention provide an arrangement for mounting an output shaft designed as a spider shaft of a planetary gear set of a transmission.

An arrangement for mounting an output shaft designed as a spider shaft of a planetary gear set of a transmission is provided, which includes an axial needle bearing arranged between an output-side spider plate of the output shaft and a housing of the transmission in order to counteract axial planetary gear set forces on the housing acting in the direction of the output, a radial needle bearing for the radial mounting of the output shaft in the housing, and a thrust washer attached to the output shaft with the aid of a snap ring in order to counteract axial forces on the housing acting in the direction of the input, such as lateral acceleration forces.

According to example aspects of the invention, a shaft sealing ring is provided on the side of the thrust washer facing the output. The thrust washer is designed in such a way that the thrust washer and the snap ring for attaching the thrust washer plunge or extend into the interior space of the shaft sealing ring. Moreover, when an oil pressure chamber is provided, a sealing sleeve is provided on the side of the radial needle bearing facing the output.

Advantageously, an axially compact design arises as a result; the additional support disk utilized according to the prior art as well as an additional snap ring for mounting the support disk are omitted.

Due to the double axial mounting of the output shaft, a precise mounting in both directions is achieved, which is necessary since the needle sleeve of the radial needle bearing and the sealing sleeve must seal an oil pressure chamber, if present, across all tolerance positions, at a rectangular ring in each case, and an integrated sensor tooth system of the output shaft for an available speed sensor must not undergo any great axial position shifts in order to ensure the functionality of the speed measurement.

Since a shaft sealing ring, during installation, requires a relatively high axial installation tolerance which must be provided in the installation space, additional axial installation space is saved, according to a refinement of the invention, due to the fact that the seat of the shaft sealing ring is displaced radially outward above the thrust washer, and so the seat of the shaft sealing ring is arranged radially above the thrust washer. Due to an undercut in the housing, additional axial installation space for the shaft sealing ring above the thrust washer on the housing may be generated in this way.

According to example aspects of the invention, the contour of the thrust washer, as a formed sheet-metal part, is designed in such a way that an installation of the snap ring may take place over a protective sleeve over the output shaft across all tolerance positions, wherein the thrust washer does not have direct contact with the sealing sleeve during operation.

Moreover, the thrust washer may be designed in such a way that its contour allows for the transport of leakage oil from the dynamic seal between the sealing sleeve and the corresponding rectangular ring radially outward via the contour of the thrust washer, in the area of the thrust race of the thrust washer in order to minimize friction with respect to the housing.

According to one further example embodiment, the thrust washer may be made of plastic. Moreover, the sealing sleeve can be omitted in embodiment variants without an oil pressure chamber.

Moreover, the thrust washer may include integrated anti-torsion mechanisms with respect to the snap ring. In addition, a locking washer may be provided, which is arranged on the side of the thrust washer facing the shaft sealing ring, is attached to the thrust washer, and is utilized for radially securing the snap ring against escape from the snap ring groove due to the centrifugal acceleration at a high rotational speed; an escape toward the outside is prevented upon occurrence of a deformation of the snap ring. The installation of the locking washer takes place after the installation of the snap ring.

According to example aspects of the invention, the locking washer may be made of plastic and may be attached to the thrust washer with the aid of integrated clip elements or via pinning or screw threads. Preferably, the locking washer is arranged in the interior space of the shaft sealing ring, whereby no additional axial installation space is necessary.

BRIEF DESCRIPTION OF THE DRAWINGS

The invention is explained in greater detail in the following, by way of example, with reference to the attached figures. Wherein.

DETAILED DESCRIPTION

Figure 1:
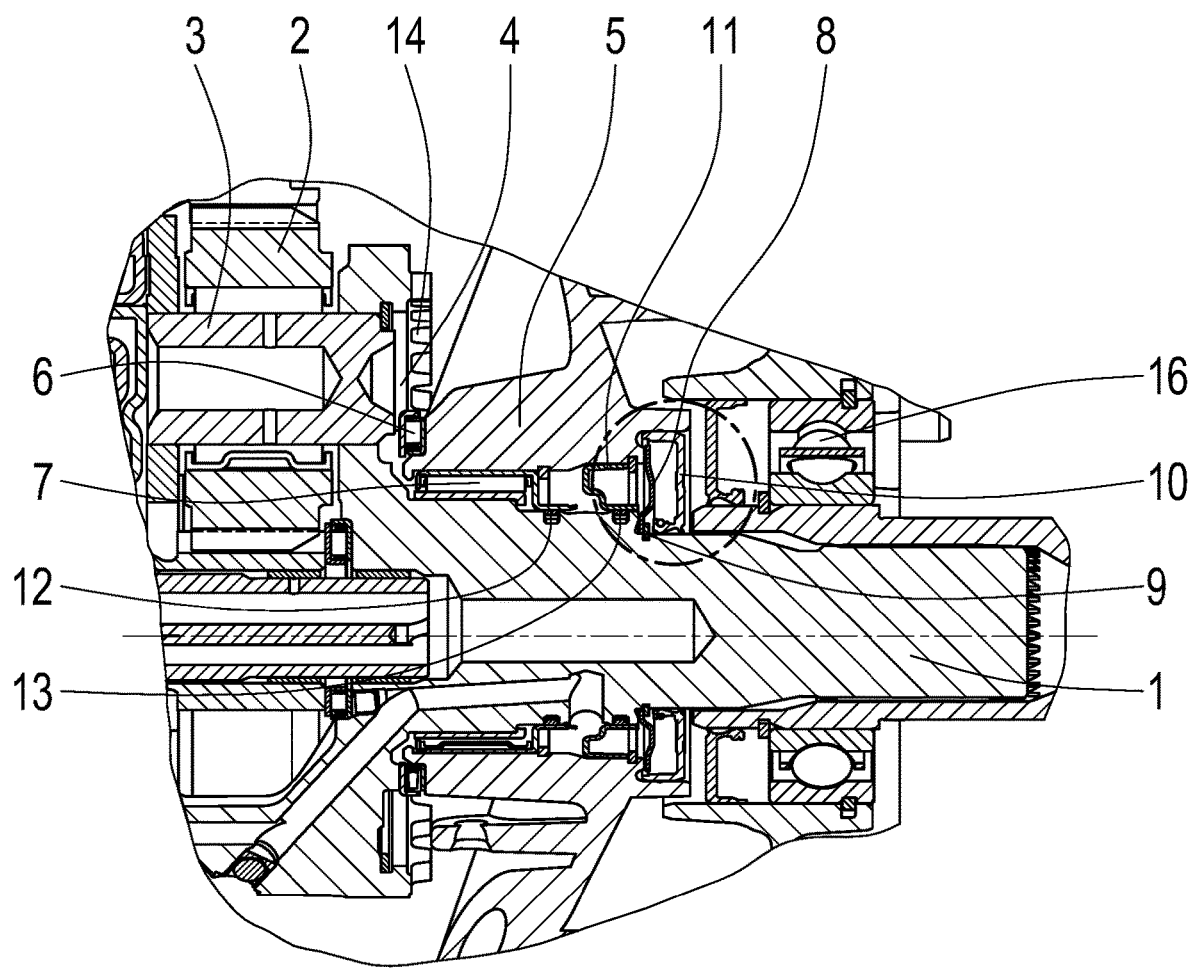
FIG. 1: shows a diagrammatic view of a part of a planetary gear set of a transmission for illustrating an embodiment of the arrangement according to the invention for mounting an output shaft designed as a spider shaft of the planetary gear set of the transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

An output shaft 1 designed as a spider shaft of a planetary gear set of a transmission is represented in FIG. 1. A planet gear is marked with the reference character 2. A planet shaft for mounting the planet gear 2 is marked with the reference character 3.

The arrangement for mounting the output shaft 1 designed as a spider shaft of a planetary gear set includes an axial needle bearing 6 arranged between an output-side spider plate 4 of the output shaft 1 and a housing 5 of the transmission in order to counteract axial planetary gear set forces on the housing 5 acting in the direction of the output, a radial needle bearing 7 for the radial mounting of the output shaft 1 in the housing 5, and a thrust washer 8 attached to the output shaft 1 with the aid of a snap ring 9 in order to counteract axial forces on the housing 5 acting in the direction of the input.

Figure 2:
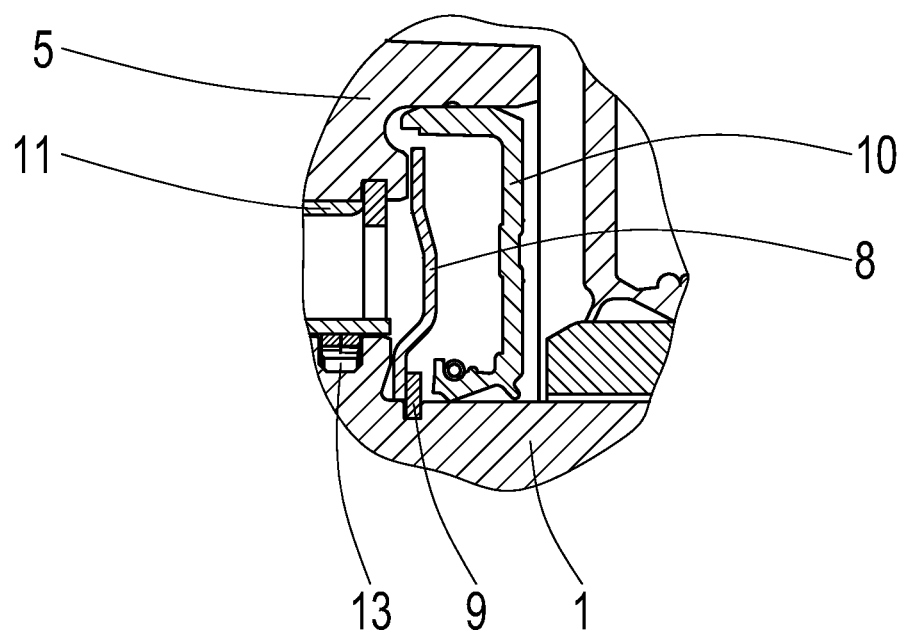
FIG. 2: shows a detailed view of the embodiment shown in FIG. 1 for illustrating the arrangement of the thrust washer and the snap ring for attaching the thrust washer in the interior space of the shaft sealing ring.

Moreover, the arrangement for mounting the output shaft 1 includes a shaft sealing ring 10 arranged on the side of the thrust washer 8 facing the output, into the interior space of which the thrust washer 8 and the snap ring 9 for attaching the thrust washer 8 plunge or extend. The seat of the shaft sealing ring 10 is preferably arranged radially above the thrust washer 8, as illustrated with the aid of FIG. 2.

As may be seen in FIG. 1, a sealing sleeve 11 is provided on the side of the radial needle bearing 7 facing the output, axially between the radial needle bearing 7 and the thrust washer 8. In FIG. 1, rectangular rings are marked with reference characters 12 and 13, at which the needle sleeve of the radial needle bearing 7 and the sealing sleeve 11, respectively, seal the oil pressure chamber across all tolerance positions. For the case in which an oil pressure chamber is not provided, the sealing sleeve is omitted, whereby the necessary axial installation space is further reduced.

An integrated sensor tooth system of the output shaft 1 is marked with 14 in FIG. 1, which is utilized in combination with a speed sensor (not represented) for measuring the rotational speed of the output shaft. The mounting or bearing 16 of the output shaft 1 in a transfer gearbox is also represented in FIG. 1. The torque at the transmission output shaft is distributed to the front axle and the rear axle with the aid of a tooth system via a subsequently installed transfer gearbox.

Figure 3:
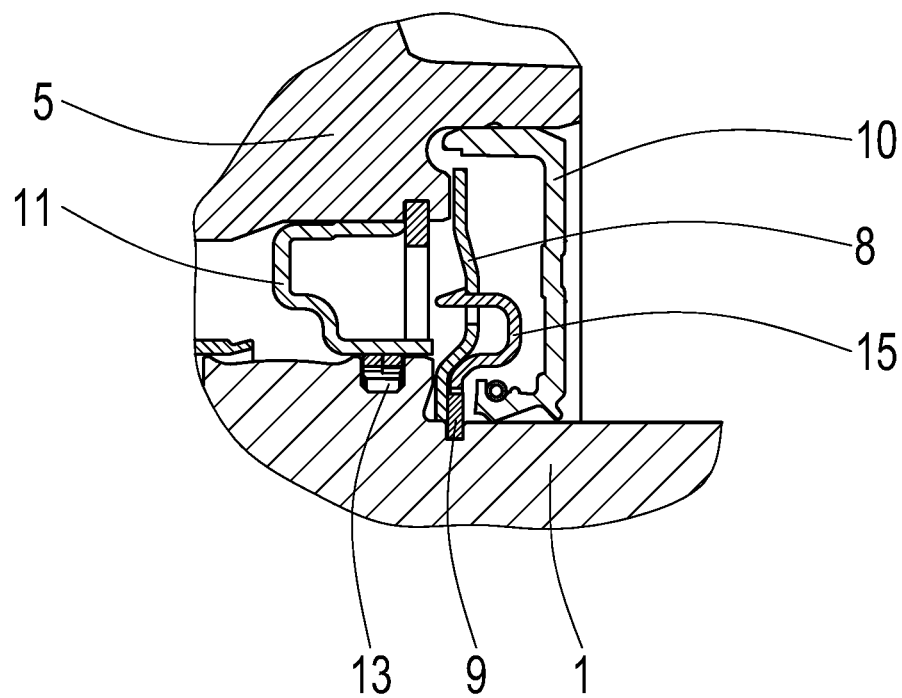
FIG. 3: shows a diagrammatic view for illustrating the arrangement of the locking washer according to one further embodiment of the invention.

According to one example refinement of the invention, and with reference to FIG. 3, a locking washer 15 may be provided, which is arranged on the side of the thrust washer 8 facing the shaft sealing ring 10 and is attached to the thrust washer 8. The locking washer 15 is utilized for radially securing the snap ring 9 against escape from the snap ring groove due to the centrifugal acceleration at a high rotational speed; the installation of the locking washer takes place after the installation of the snap ring 9 and before the installation of the shaft sealing ring 10.

Figure 4:
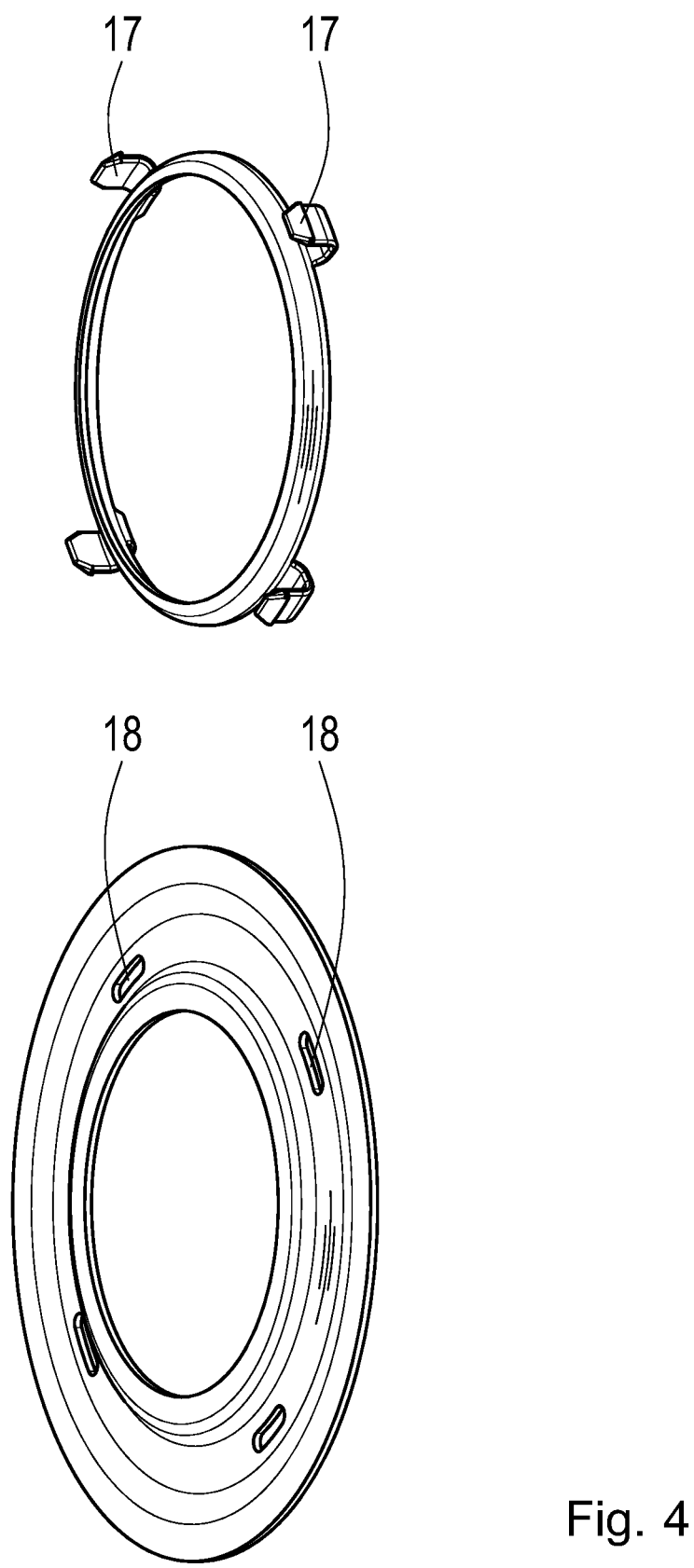
FIG. 4: shows diagrammatic perspective views of a thrust washer and a locking washer for illustrating a possibility for attaching the locking washer to the thrust washer.

The locking washer 15 may be made of plastic and may be attached to the thrust washer 8 with the aid of integrated clip elements 17 via corresponding recesses 18 of the thrust washer 8, as illustrated in FIG. 4.

Modifications and variations can be made to the embodiments illustrated or described herein without departing from the scope and spirit of the invention as set forth in the appended claims.

REFERENCE CHARACTERS 1 output shaft
2 planet gear
3 planet shaft
4 spider plate
5 housing
6 axial needle bearing
7 radial needle bearing
8 thrust washer
9 snap ring
10 shaft sealing ring
11 sealing sleeve
12 rectangular ring
13 rectangular ring
14 sensor tooth system
15 locking washer
16 mounting
17 clip element
18 recess

The invention claimed is:

1. An arrangement for mounting an output shaft (1) designed as a spider shaft of a planetary gear set of a transmission, comprising:
an axial needle bearing (6) arranged between an output-side spider plate (4) of the output shaft (1) and a housing (5) of the transmission in order to counteract axial planetary gear set forces on the housing (5) acting in the direction of an output side of the transmission;

a radial needle bearing (7) for radial mounting of the output shaft (1) in the housing (5);

a thrust washer (8) attached to the output shaft (1) with a snap ring (9) in order to counteract axial forces on the housing (5) acting in the direction of an input side of the transmission; and a shaft sealing ring (10) arranged on a side of the thrust washer (8) facing the output side of the transmission, the thrust washer (8) and the snap ring (9) extending into an interior space of the shaft sealing ring (10).

2. The arrangement of claim 1, further comprising a sealing sleeve (11) arranged on a side of the radial needle bearing (7) facing the output side of the transmission, the sealing sleeve (11) also arranged axially between the radial needle bearing (7) and the thrust washer (8).

3. The arrangement of claim 1, wherein a seat of the shaft sealing ring (10) is arranged radially outward of the thrust washer (8).

4. The arrangement of claim 1, further comprising a locking washer (15) that radially secures the snap ring (9) against escape from a snap ring groove due to centrifugal acceleration at a high rotational speed, the locking washer (15) arranged on a side of the thrust washer (8) facing the shaft sealing ring (10), the locking washer (15) attached to the thrust washer (8).

5. The arrangement of claim 4, wherein the locking washer (15) is a plastic locking washer and is attached to the thrust washer (8) with integrated clip elements (17) via corresponding recesses (18) of the thrust washer (8).

6. The arrangement of claim 4, wherein the locking washer (15) is arranged in the interior space of the shaft sealing ring (10).

7. The arrangement of claim 1, wherein the thrust washer (8) is a formed sheet-metal thrust washer or a plastic thrust washer, and a contour of the thrust washer (8) is shaped such that the snap ring (9) is installable over a protective sleeve on the output shaft (1) across all tolerance positions.

8. The arrangement of claim 1, further comprising a sealing sleeve (11) arranged on a side of the radial needle bearing (7) facing the output side of the transmission, the sealing sleeve (11) also arranged axially between the radial needle bearing (7) and the thrust washer (8), wherein a contour of the thrust washer (8) is shaped to allow for transport of leakage oil from a dynamic seal between the sealing sleeve (11) and a corresponding rectangular ring (13) radially outward, via the contour of the thrust washer (8), at the thrust race of the thrust washer (8).

9. The arrangement of claim 1, wherein the thrust washer (8) comprises integrated anti-torsion mechanisms with respect to the snap ring (9).

* * * * *